(12) United States Patent
Sun et al.

(10) Patent No.: US 8,201,988 B2
(45) Date of Patent: Jun. 19, 2012

(54) ADSORBER GRID DISTRIBUTOR BOX DESIGN

(75) Inventors: Bing Sun, South Barrington, IL (US); Paul A. Sechrist, South Barrington, IL (US)

(73) Assignee: UOP LLC, Des Plaines, IL (US)

( * ) Notice: Subject to any disclaimer, the term of this patent is extended or adjusted under 35 U.S.C. 154(b) by 599 days.

(21) Appl. No.: 12/406,551

(22) Filed: Mar. 18, 2009

(65) Prior Publication Data

US 2010/0238761 A1  Sep. 23, 2010

(51) Int. Cl.
*B01F 15/02* (2006.01)
*B01D 24/00* (2006.01)

(52) U.S. Cl. ........ 366/134; 210/283; 210/284; 210/285; 366/173.1; 366/174.1

(58) Field of Classification Search .................. 366/134, 366/173.1, 174.1; 210/289, 456, 283, 284; 422/224
See application file for complete search history.

(56) References Cited

U.S. PATENT DOCUMENTS

| | | | | |
|---|---|---|---|---|
| 3,214,247 A * | 10/1965 | Broughton | ..................... | 422/607 |
| 3,598,541 A * | 8/1971 | Hennemuth et al. | .......... | 422/607 |
| 3,598,542 A * | 8/1971 | Carson et al. | .................. | 422/607 |
| 3,623,978 A * | 11/1971 | Boze et al. | ..................... | 210/732 |
| 3,723,300 A * | 3/1973 | Carson et al. | .................. | 208/146 |
| 3,789,989 A * | 2/1974 | Carson | ........................... | 210/284 |
| 4,140,625 A * | 2/1979 | Jensen | .......................... | 208/146 |
| 4,378,292 A * | 3/1983 | Haase | ............................ | 210/266 |
| 5,025,831 A * | 6/1991 | Wong et al. | ............... | 137/561 A |
| 5,846,411 A * | 12/1998 | Harter et al. | ............... | 210/198.2 |
| 6,024,871 A * | 2/2000 | Harter et al. | ............... | 210/198.2 |
| 6,093,317 A * | 7/2000 | Capelle et al. | ............. | 210/198.2 |
| 6,454,948 B2 * | 9/2002 | Ferschneider et al. | ........ | 210/659 |
| 6,797,175 B2 * | 9/2004 | Hotier | ........................... | 210/659 |
| 7,314,551 B2 * | 1/2008 | Frey et al. | .................. | 210/198.2 |
| 7,914,673 B2 * | 3/2011 | Frey et al. | .................. | 210/198.2 |
| 2005/0163682 A1 * | 7/2005 | Jacobs et al. | .................. | 422/228 |
| 2010/0238761 A1 * | 9/2010 | Sun et al. | ...................... | 366/134 |

* cited by examiner

*Primary Examiner* — Tony G Soohoo
(74) *Attorney, Agent, or Firm* — Mark R Willis

(57) ABSTRACT

An apparatus is presented for the mixing of a feed fluid with a process fluid between two adsorbent beds. The apparatus creates a space for mixing and redistributing a fluid mixture between the two adsorbent beds, where a process fluid is received from the upper adsorbent bed, and a distributor box passes the feed fluid to space between the adsorbent beds and mixes the feed fluid with the process fluid. The mixture is then redistributed and passed through to the lower adsorbent bed.

20 Claims, 4 Drawing Sheets

ADSORBER GRID DISTRIBUTOR BOX DESIGN

FIELD OF THE INVENTION

This invention relates to a device for mixing and distributing liquid uniformly over the cross-section of an adsorbent bed. The device resides between two adsorbent beds where the effluent from an upper bed is collected and mixed with a feed fluid and redistributed over the top of the lower bed.

BACKGROUND OF THE INVENTION

The chemical and petroleum process industries use many types of vessels in processing and/or purifying chemicals. The processing and/or purifying often involves mixing fluids and passing a mixture of the fluids over an adsorption bed, a reactor bed, or passing the fluids over trays in a distillation column. One particular type of vessel is a multibed reactor, with cocurrent flow of a process fluid and a feed fluid. The multibed reactor comprising a series of solid particulate beds of catalyst particles that react a process fluid flowing over the beds. The efficiency and life of the catalyst bed are influenced by the distribution of fluid flowing over the bed. The feed fluid can be added as a reactant, or as a quench fluid, for a process stream that flows over a catalyst bed. Redistribution and mixing is important for maximizing catalyst bed life, and maximum utilization of the catalyst by preventing dead zones, or zones in the catalyst bed having low flow.

Other types of vessels include countercurrent flow reactors, separation vessels having cocurrent flow, or countercurrent flow. Many of these processes are affected by the manner in which a fluid, to be reacted, separated, or otherwise processed, is distributed in the vessel.

One important type of process is the adsorption separation process. The adsorption separation process has been developed through simulated moving bed (SMB) technology, where the adsorption separation process can be operated on a continuous basis. The simulation of a moving adsorbent bed is described in U.S. Pat. No. 2,985,589 (Broughton et al.). In accomplishing this simulation, it is necessary to connect a feed stream to a series of beds in sequence, first to bed no. 1, then to bed no. 2, and so forth for numerous beds, the number of beds often being between 12 and 24. These beds may be considered to be portions of a single large bed whose movement is simulated. Each time the feed stream destination is changed, it is also necessary to change the destinations (or origins) of at least three other streams, which may be streams entering the beds, such as the feed stream, or leaving the beds. The moving bed simulation may be simply described as dividing the bed into series of fixed beds and moving the points of introducing and withdrawing liquid streams past the series of fixed beds instead of moving the beds past the introduction and withdrawal points.

There are many different process requirements in moving bed simulation processes, resulting in different flow schemes. For example, in addition to the four basic streams described in Broughton (U.S. Pat. No. 2,985,589), it may be desirable to utilize one or more streams to purge, or flush, a pipeline or pipelines. A flush stream is used to prevent undesirable mixing of components. The flush substance is chosen to be one which is not undesirable for mixing with either main stream, that being purged or that which enters the pipeline after flushing is completed. U.S. Pat. No. 3,201,491 (Stine et al.) may be consulted for information on flushing lines as applied to the process of Broughton (U.S. Pat. No. 2,985,589). In addition, the efficiency of the process has many factors, including the redistribution of fluid from one bed to the next, and the mixing and redistribution of a process fluid with one of the feed streams between two beds.

Improvements in the fluid distributers can improve efficiency and increase the life of the adsorbents in the adsorption separation system.

SUMMARY OF THE INVENTION

The invention provides an apparatus is presented for the mixing of a feed fluid with a process fluid between two adsorbent beds. The apparatus creates a space for mixing and redistributing a fluid mixture between the two adsorbent beds, where a process fluid is received from the upper adsorbent bed, and a distributor box passes the feed fluid to space between the adsorbent beds and mixes the feed fluid with the process fluid. The mixture is then redistributed and passed through to the lower adsorbent bed. The apparatus comprises an upper screen having apertures distributed therein for the flow of the process fluid from an upper adsorbent bed. A distributor box having an inlet for admitting the feed fluid and a plurality of fluid outlets is suspended below the upper screen. The apparatus includes baffles positioned below the distributor box fluid outlets, where the process fluid flows across the outlets and mixes with the feed fluid in a cross-flow mixing pattern. The apparatus further includes a lower screen positioned below the baffles for distributing the fluid mixture to the lower adsorbent bed. The lower screen includes a splash plate positioned below gaps between the baffles where the fluid mixture flows to redirect the fluid mixture over the lower screen.

Other objects, advantages and applications of the present invention will become apparent to those skilled in the art from the following detailed description and drawings.

DETAILED DESCRIPTION OF THE INVENTION

Figure 1:
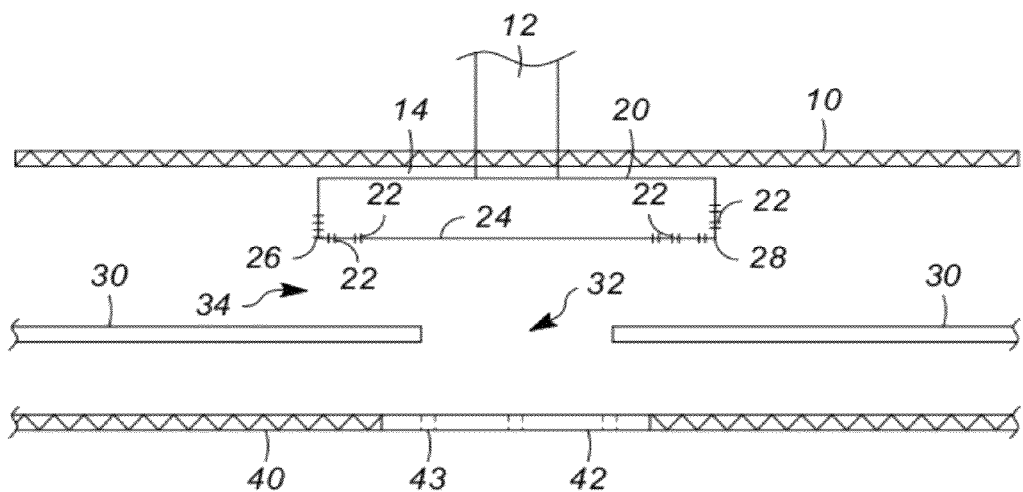
FIG. 1 is one design of the present invention showing the distributor box and its position within the flow redistribution apparatus.

A wide variety of processes use co-current flow reactors, or reactors where there is a single phase fluid that flows over a solid bed of particulate materials, to provide for contact between the fluid and a solid. In an adsorption separation system, the solid usually comprises an adsorbent material which preferentially adsorbs one or more components in a mixture. The adsorbed material is then removed from the adsorbent by passing a desorbent over the solid bed, and the desorbed component or components are collected. The fluid can be a liquid, vapor, or mixture of liquid and vapor.

Co-current adsorbers with fixed beds are constructed such that the reactor allows for the fluid to flow over the adsorbent bed. When the fluid is a liquid, the fluid is usually directed to flow downward through the adsorber. There are many aspects for providing good contact between the fluid and the solid. Multibed adsorber are also frequently used, where the adsorbent beds are stacked one over the other within an adsorbent vessel. Typically, they are stacked with some space between the beds.

With multibed adsorbers the space between beds are convenient mixing zones. In addition to remixing fluids passing from one bed to the next, the spaces between beds are often used to add additional fluids, or to draw off fluids. This is particularly true for a simulated moving bed system, where the system has two feed streams and two drawoff streams. The feed streams are the process stream containing components to be separated and a desorbent stream, and the two drawoff streams are the extract stream containing the components that were preferentially adsorbed and a raffinate stream containing the components that were not preferentially adsorbed.

The current liquid distributors comprise a toroidal, or ring, shaped device with a rectangular cross-section, or box shape. The grid distributor box is connected to a feed pipe with a solid splash plate at the bottom of the box and outlet holes on the sides of the box. A feed stream enters the box through an inlet feed pipe and flows out through the holes on the sides of the box. The distributor box is in a mixing zone between adsorbent beds. The process stream enters the mixing zone wherein a baffle directs the process stream toward the distributor box and the process stream and mixes with the feed stream.

The distributor box has a series of holes above the baffle, and a series of holes below the baffle. The process stream impinges on the distributor box as it passes from above the baffle to below the baffle, and mixes with the feed exiting the holes above the baffle in a counter-current flow mixing and mixes with the feed exiting the holes below the baffle in a co-current flow mixing. The resulting mixture is then redistributed on the screen below the baffle. The splash plate is designed to prevent any jet flow introduced from the gap between the baffle and the distributor box. This is to reduce the risk of localized fluidization of a particulate bed which can cause fine generation.

Problems associated with the current design include: (1) poor mixing between the feed stream and the process stream; (2) designing the gap size to take into consideration the jet flow and axial flow mal-distribution; and (3) the solid splash plate casts a shadow, where there is poor flow distribution below the splash plate, and subsequent poor usage of a portion of the bed region below the plate.

The present invention provides a means to overcome these problems. The present invention is an apparatus for distributing and mixing a feed fluid with a process fluid. As shown in FIG. 1, the apparatus includes an upper screen 10 having apertures distributed therein, a distributor box 20 having an inlet 12 and a plurality of fluid outlets 22 wherein a portion of the distributor box is suspended below the upper screen 10, at least one baffle 30 disposed beneath a portion of the distributor box 20, and a lower screen 40 disposed beneath the at least one baffle 30 and having apertures distributed therein. The baffles 30 form a gap 32 for a mixture of the feed and process fluid to pass to the lower screen 40. The lower screen 40 includes a splash plate 42 disposed beneath the gap 32 formed by the baffles 30. In FIG. 1, the distributor box 20 is disposed beneath the upper screen 10, such that there is a gap 14 between the upper screen 10 and the distributor box 20. This gap provides space for the process fluid from the bed above the distribution apparatus to flow around the distributor box 20.

In one embodiment, the distributor box 20 has a bottom plane 24 and the fluid outlets 22 are holes distributed over the bottom plane 24 toward the edges 26, 28 of the plane 24. The baffles 30 are positioned beneath the fluid outlets 22 and the process fluid flows across the gap 34 between the baffles 30 and the distributor box 20. The baffles 30 should overlap the fluid outlet ports 22 to provide good mixing. This can be achieved with at least a 30 mm spacing from the outlet ports 22 to the edge of the baffles 30. The feed fluid mixes with the process fluid in a cross flow mixing environment, and the subsequent mixture passes through the baffle gap 32 to the lower screen 40. The baffle gap 32 can be sized sufficiently large to prevent fluid jetting onto the splash plate 42, and the width of the splash plate 42 is preferably greater than the width of the baffle gap 32.

The splash plate 42 can include apertures for allowing some of the mixture to pass through to the adsorbent bed below the lower screen 40. In a preferred embodiment, the percent open area of the splash plate 42 from the apertures is less than the percent open area of the lower screen 40. One embodiment for producing a smaller percentage open area is for the apertures in the splash plate 42 to be sized smaller than the apertures in the lower screen 40. The smaller open area, or smaller apertures, facilitates the distribution of the fluid mixture across the lower screen 40 for a more uniform passage through to the bed below the lower screen 40, while permitting a portion of the fluid mixture to pass through the splash plate 42. In one embodiment, the apertures in the lower screen 40 and the splash plate 40 are sized to be sufficiently small to prevent the passage of adsorbent particles from below the apparatus.

Figure 5:
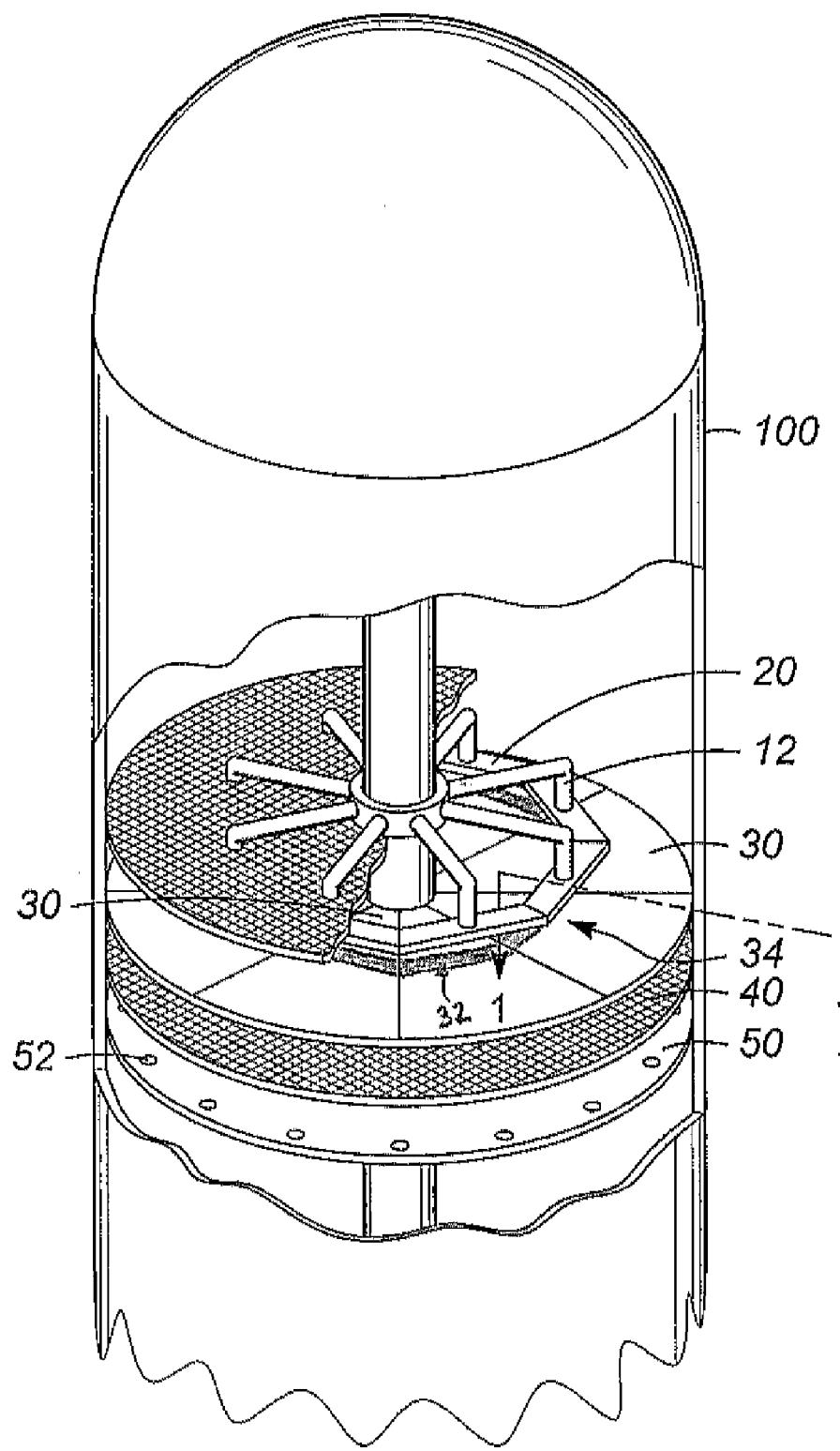
FIG. 5 is a perspective view of one design of the present invention showing several distributor boxes and flow redistribution apparatuses oriented about a central feed pipe within a cylindrical vessel.

The apparatus can, optionally, further include a flow distributor plate 50 as best seen with reference to FIG. 5 positioned beneath the lower screen 40 and placed on top of the adsorbent bed. The flow distributor plate can further even the flow, and can contribute to restricting adsorbent movement at the top of the bed, where the flow distributor plate has apertures 52 sized sufficiently small to prevent to passage of adsorbent through the flow distributor plate. The embodiment encompassing a flow distributor plate can incorporate larger apertures in the lower screen 40 and the splash plate 42, as the adsorbent is restricted from passing through the flow distributor plate.

A general design for the distributor box 20 is a toroidal shape as illustrated in FIG. 5, having a rectangular cross-section, and where the upper 10 and lower 40 screens have a generally circular configuration. The apparatus is disposed within a cylindrical vessel 100, where the apparatus is positioned between beds of solid particles. The distributor box 20 is positioned wherein the center of the cross-section is between 50% and 80% of the distance from the center of the upper screen 10 to the outer edge of the upper screen 10. The distance from the center to the outer edge is the radius of the screen 10. In a preferred design the center of the cross-section is positioned between 70% and 72% of the distance between the center of the upper screen 10 and the outer edge of the upper screen 10.

The flow of the process fluid passes through the upper screen 10 and a first portion passes through the central part of the screen 10 that is located within the inner edge of the distributor box 20, and a second portion passes through the screen that is located between the outer edge of the distributor box 20 and the outer edge of the screen 10. Ideally, the first portion and second portion are in substantially equal amounts to provide a balanced flow across the gaps 34 between the distributor box 20 and the baffles 30. This leads to the center of the distributor box 20 cross-section being positions at approximately 0.707 times radius of the upper screen 10.

The apparatus can include a plurality of inlets for a more even distribution of the feed stream. The apparatus provides better mixing of the feed stream and the process stream. By moving the distributor box above the baffles, and positioning the outlets 22 above the baffles, the feed stream and the process stream are mixed in a cross-current fashion. The present invention can include fluid outlets 22 for counter-current mixing also. The distributor box 20 has sides wherein fluid outlets 22 are disposed in the sides. This provides counter-current mixing for process fluid flowing toward the distributor box 20 and cross-current mixing for fluid flowing down along the distributor box side planes.

The upper screen 10 of the present invention includes a region over the distributor box 20 where there is little or no flow across the screen 10 due to the distributor box 20 blocking that region. The upper screen can include a solid piece of material in that location, or a portion of the distributor box 20 can protrude above the screen 10. The upper portion of the distributor box 20 can be shaped to facilitate flow around the distributor box 20, such as a triangular shape for fluid to direct the process stream around the distributor box 20.

Figure 2:
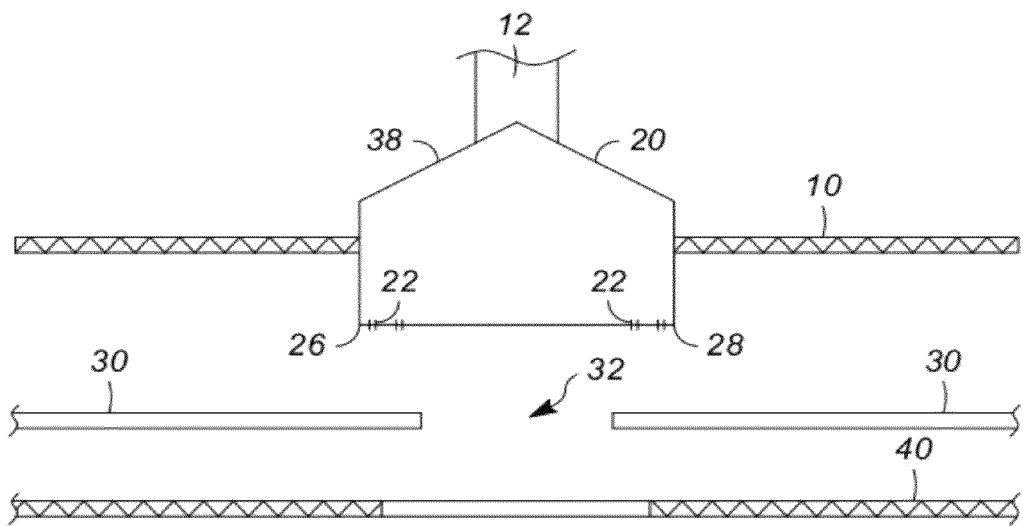
FIG. 2 is one design of the present invention showing the distributor box and its position partially above the top screen.

In an embodiment, as shown in FIG. 2, the distributor box 20 is disposed partially below the upper screen 10. The top 38 of the distributor box 20 can be flat, or shaped to facilitate flow of process fluid in the bed above the upper screen 10 toward the edges of the distributor box 20. In FIG. 2, the shape is presented as peaked, and is not meant to be limiting to this shape, but to include any possible shape for the top portion of the distributor box 20. The distributor box 20 includes outlet ports 22 for the distribution of a feed stream to mix with the process stream. The apparatus includes the upper screen 10 which is fitted around the distributor box 20, baffles 30 which are positioned beneath the outlet ports 22 of the distributor box 20. The gap 32 can be sized to maintain a maximum flow of the mixture of the process stream and feed stream through the gap 32. The distributor box 20 can be designed to have a substantial aspect ratio of width to height, in order to maintain the outlet ports 22 positioned above the baffles 30 and to enable control in the sizing of the gap 32. The aspect ratio also can be used to maintain the flow conditions for the feed stream, while minimizing the overall height of the apparatus; or the upper screen 10, the distributor box 20, the baffles 30, and the lower screen 40.

For larger adsorption separation systems, the manufacture of large circular screens, and of large toroidally shaped units can pose manufacturing and structural problems. In one embodiment, the apparatus comprises a plurality of substantially wedge shaped sections, where there are anywhere from 8 to 40 sections. The subdividing of the apparatus into smaller units that are then fastened together overcome the structural and manufacturing issues. Typically, when the wedge section design is used, there are between 20 and 30 sections and more typically between 24 and 28 sections. When the design consists of the wedge shaped sections, the distributor box is a collection of trapezoidally shaped boxes when viewed from above, such that when fitted together form a polygonal shaped figure that approximates a toroidal shape. The wedge shaped sections include side flanges for attaching sections together, and for providing structural rigidity to the apparatus. The side flanges can be solid, or include openings to allow cross-flow between sections during operation.

Figure 3:
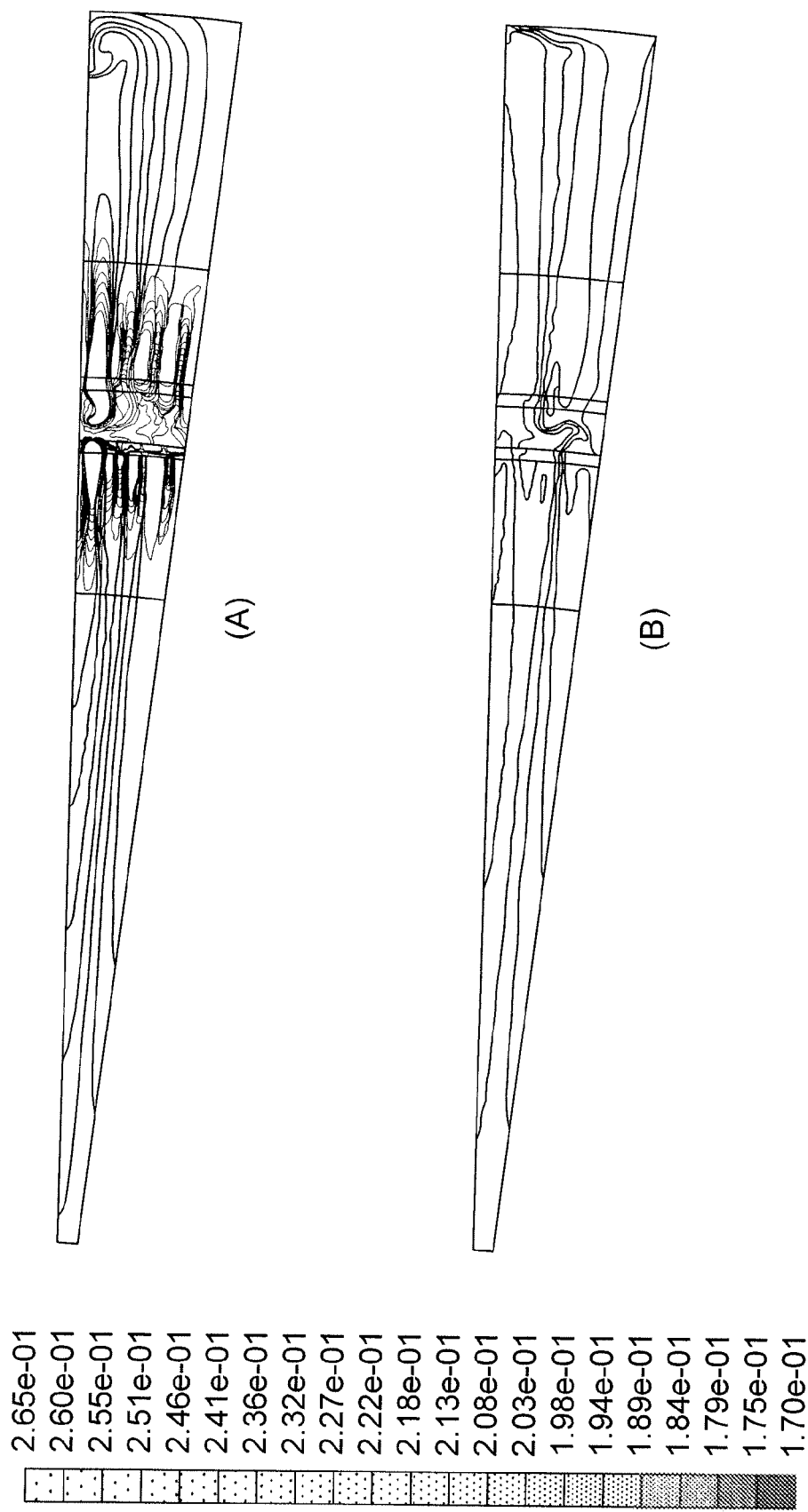
FIG. 3 is a comparison of flow patterns for (a) the existing distributor box design and (b) the new distributor box design.

The apparatus is for mixing the feed stream with the process stream before distributing the mixture over the surface of the adsorbent bed below the apparatus. The design was tested using theoretical modeling of the flows using computational fluid dynamics. A computational simulation of the process is shown in FIG. 3. FIG. 3a shows the distribution of the feed stream fraction on the top of the adsorbent bed below the apparatus for an existing distributor design. FIG. 3b shows the distribution of fraction for the present invention. A theoretical complete mixture will have a fraction of 0.223 of the feed component over the surface of the bed. The present invention provides for better mixing and significantly reduces the relatively high concentration of the feed fraction in the area around the splash plate. The existing distributor design shows concentrations of the feed fraction delivered to the adsorbent bed to have regions below 0.17 or above 0.265 which is substantially outside the desired range. The new design shows the mixing to be of sufficiently high quality that the feed fraction delivered to adsorbent bed is between 0.2 to 0.24. The results indicate a significant improvement in the mixing of the fluids.

Figure 4:
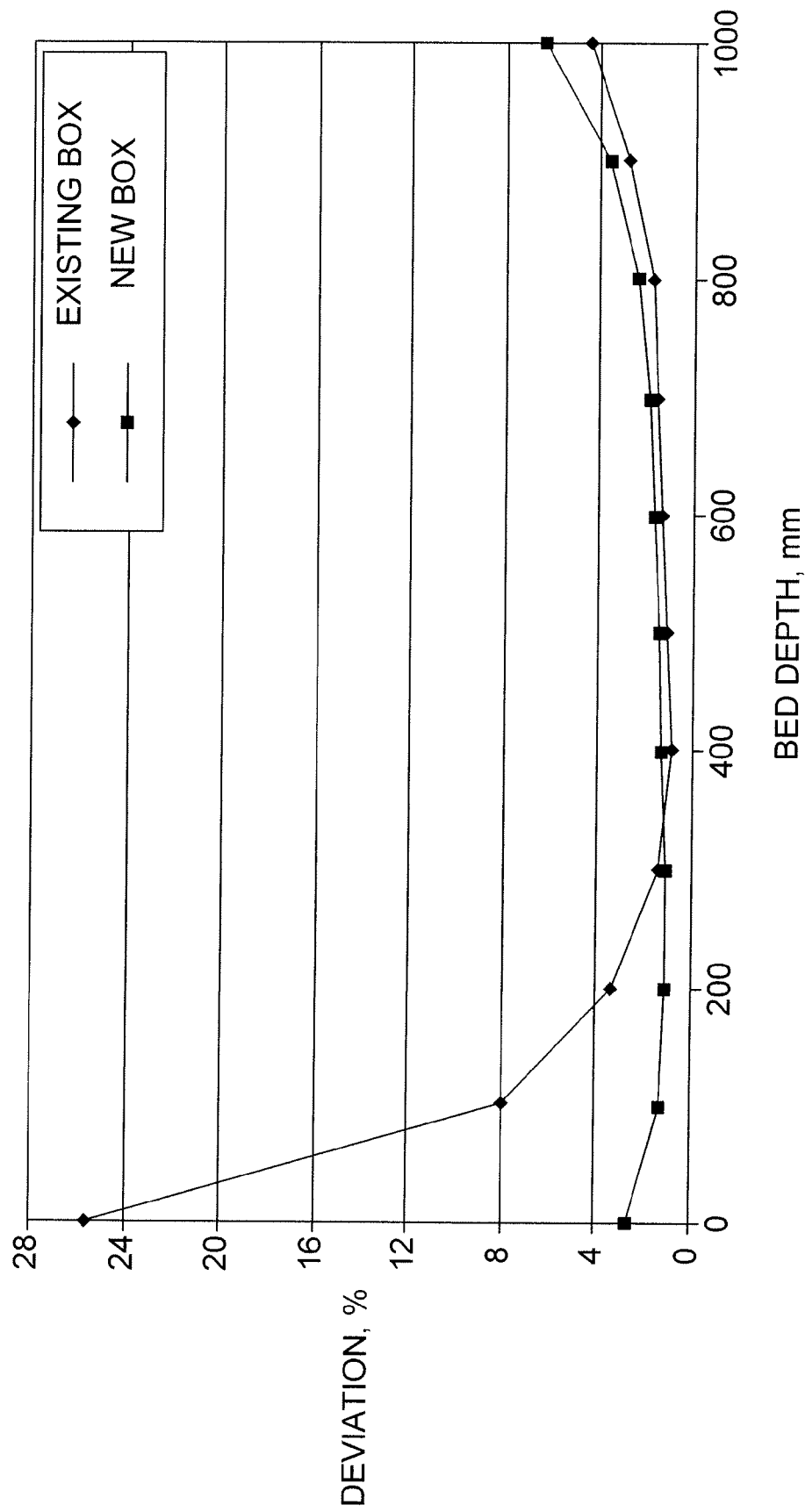
FIG. 4 is a plot of the deviation of the axial flow versus bed depth for the existing and new distributor box designs.

Another measure of the improvement is the variation in the flow velocity. The maximum axial velocity deviation from the average flow velocity is shown in FIG. 4 for the two cases. The existing design creates regions where the axial velocity is relatively high. The local high velocities can lead to fluidization of the adsorbent, which can lead to excess fines and a reduced life of the adsorbent. FIG. 4 presents computational results of the maximum axial velocity deviation from the average flow velocity as one progresses down through an adsorbent bed. The distance down through the bed is from the top of the bed, or at a position just below the lower screen 40, and progressing downward through a one meter thick bed. From the results, it can be seen there is a significant reduction in the deviation at the top of the bed. This indicates a much reduced chance of fluidization of the adsorbent at the top of the bed.

For smaller adsorption separation systems, the design for the distributor box can be of a generally rectangular prismatic shape, rather than a toroidal shape. The apparatus can comprise an upper screen 10, at least one distributor box 20, having a fluid inlet 12 and a plurality of fluid outlets 22. The distributor box 20 is preferably disposed below the upper screen 10, but can be disposed in such a manner as to be partially above the upper screen 10 and partially below the screen 10 with the fluid outlet ports 22 disposed below the screen 10. The apparatus includes at least two baffles 30, wherein each baffle is disposed below the fluid outlet ports 22 of the distributor box 20, and the baffles 30 are spaced to form a baffle gap 32 below the distributor box 20, but at a position that is displaced horizontally relative to the fluid outlet ports 22. A lower screen 40 is positioned below the baffles 30, and includes a splash plate 42 located within the lower screen 40. The splash plate 42 can include apertures distributed therein, where the apertures are sized to provide approximately 15% open area of the splash plate, thus allowing flow through the splash plate, but also distribution the fluid over the lower screen 40.

21 When the adsorption separation system is small enough to allow for the generally rectangular distribution boxes 20, a plurality of the distribution boxes 20 can be distributed under the upper screen 10 to provide for a more even flow distribution and mixing of the feed stream and the process stream.

The distributor box 20 can include outlet ports 22 on the sides of the box 20. By moving the distributor box 20 above the baffles 30 and having the outlet ports 22 away from the baffle gap 32, the mixing of the process stream and the feed stream is improved.

The invention is designed as a fluid redistribution device, especially for the mixing and redistribution of a fluid mixture over a lower adsorbent bed. The apparatus can also be used as a collection device in the simulated moving bed adsorption-separation system. The simulated moving bed system comprises moving the inlets and outlets for different feeds as the process fluid progresses through successive adsorbent beds. Therefore, the inlet ports for the fluids will in different stages of the process be used as withdrawal ports for the extract and raffinate streams, wherein the extract and raffinate streams pass through the outlet ports 22 and out the inlet port of the distribution apparatus. As the process proceeds through the different stages of the simulated moving bed adsorption separation process, fluid will either be added to the system, or withdrawn from the system through the distributor box.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. An apparatus for distributing and mixing a feed fluid with a process fluid, comprising:
    an upper screen, having apertures distributed therein for the flow of the process fluid from above the upper screen to below the upper screen;
    a distributor box, having an inlet for admitting the feed fluid and a plurality of fluid outlets, wherein a portion of the distributor box is suspended below the upper screen;
    at least one baffle disposed directly beneath the fluid outlets of the distributor box, and spaced sufficiently to allow the process fluid to flow between the distributor box and the baffle; and
    a lower screen disposed below the at least one baffle and having lower screen apertures distributed therein for the flow of a mixture of the process fluid and feed fluid, and having a splash plate disposed below the edge of the baffle.

2. The apparatus of claim 1 wherein the splash plate comprises apertures and the percent open area of the splash plate is less than the percent open area of the lower screen.

3. The apparatus of claim 1 wherein the upper and lower screen have a generally circular configuration disposed within a cylindrically shaped vessel, and wherein the distributor box has an toroidal shape with a rectangular cross-section.

4. The apparatus of claim 3 wherein the center of the cross-section of the distributor box is disposed between 50% and 80% of the distance from the center of the upper screen to the outer edge of the upper screen.

5. The apparatus of claim 4 wherein the center of the cross-section of the distributor box is disposed between 70% and 72% of the distance from the center of the upper screen to the outer edge of the upper screen.

6. The apparatus of claim 3 wherein the distributor box has side planes and the fluid outlets are disposed in the side planes.

7. The apparatus of claim 3 wherein the distributor box has a bottom plane and the fluid outlets are disposed in the bottom plane.

8. The apparatus of claim 7 wherein the distributor box bottom plane has an inner edge and an outer edge, and the fluid outlets are distributed on the bottom plane toward the inner edge and toward the outer edge.

9. The apparatus of claim 8 comprising two baffles, wherein a first baffle is disposed underneath the distributor box fluid outlets distributed toward the inner edge, and the second baffle is disposed underneath the distributor box fluid outlets distributed toward the outer edge.

10. The apparatus of claim 9 wherein the two baffles are separated, forming a baffle gap, and wherein the splash plate has a width greater than the baffle gap.

11. The apparatus of claim 1 wherein the distributor box includes a plurality of fluid inlets.

12. An apparatus for distributing and mixing a feed fluid with a process fluid, comprising:
    an upper screen with a substantially circular configuration, having apertures distributed therein for the flow of the process fluid from above the upper screen to below the upper screen;
    a distributor box with an annular shape and having an inlet for admitting the feed fluid and a plurality of fluid outlets, wherein a portion of the distributor box is suspended below the upper screen, and the fluid outlets are disposed along the bottom surface of the distributor box;
    two baffles disposed beneath the distributor box, wherein each baffle is positioned directly beneath distributor box fluid outlets, spaced sufficiently to allow the process fluid to flow between the distributor box and the baffle, and wherein the two baffles are spaced to form a gap for the flow of the process fluid and feed fluid; and
    a lower screen with a substantially circular configuration disposed below the at least one baffle and having lower screen apertures distributed therein for the flow of a mixture of the process fluid and feed fluid, and having a splash plate disposed below the edge of the baffle.

13. The apparatus of claim 12 wherein the splash plate includes apertures, wherein the splash plate apertures are smaller than the lower screen apertures.

14. The apparatus of claim 12 further including a flow distributor plate disposed beneath the lower screen, and wherein the flow distributor plate has apertures distributed therein.

15. An apparatus for distributing and mixing a feed fluid with a process fluid, comprising:
    an upper screen;
    a distributor box, having a fluid inlet, and a plurality of fluid outlets, wherein the distributor box is disposed below the upper screen;
    a plurality of baffles, wherein each baffle is disposed a distance below the distributor box, and each baffle is positioned directly beneath distributor box fluid outlets; and
    a lower screen disposed below the baffles and having a splash plate.

16. The apparatus of claim 15 wherein the distributor box has a lower face, and the plurality of fluid outlets are distributed over the lower face.

17. The apparatus of claim 16 wherein the baffles form a gap beneath the distributor box where the process fluid mixes with the feed fluid forming a mixture.

18. The apparatus of claim 15 wherein the baffles are separated to form a baffle gap, and where the baffle gap is an opening for the mixture to flow to the lower screen.

19. The apparatus of claim 15 wherein the distributor box has side faces, and the plurality of fluid outlets are distributed over the side faces.

20. The apparatus of claim 15 further comprising a distributor plate disposed below the lower screen, and wherein the distributor plate has apertures distributed therein.

* * * * *